INVENTOR
WILLIAM F. MANNING

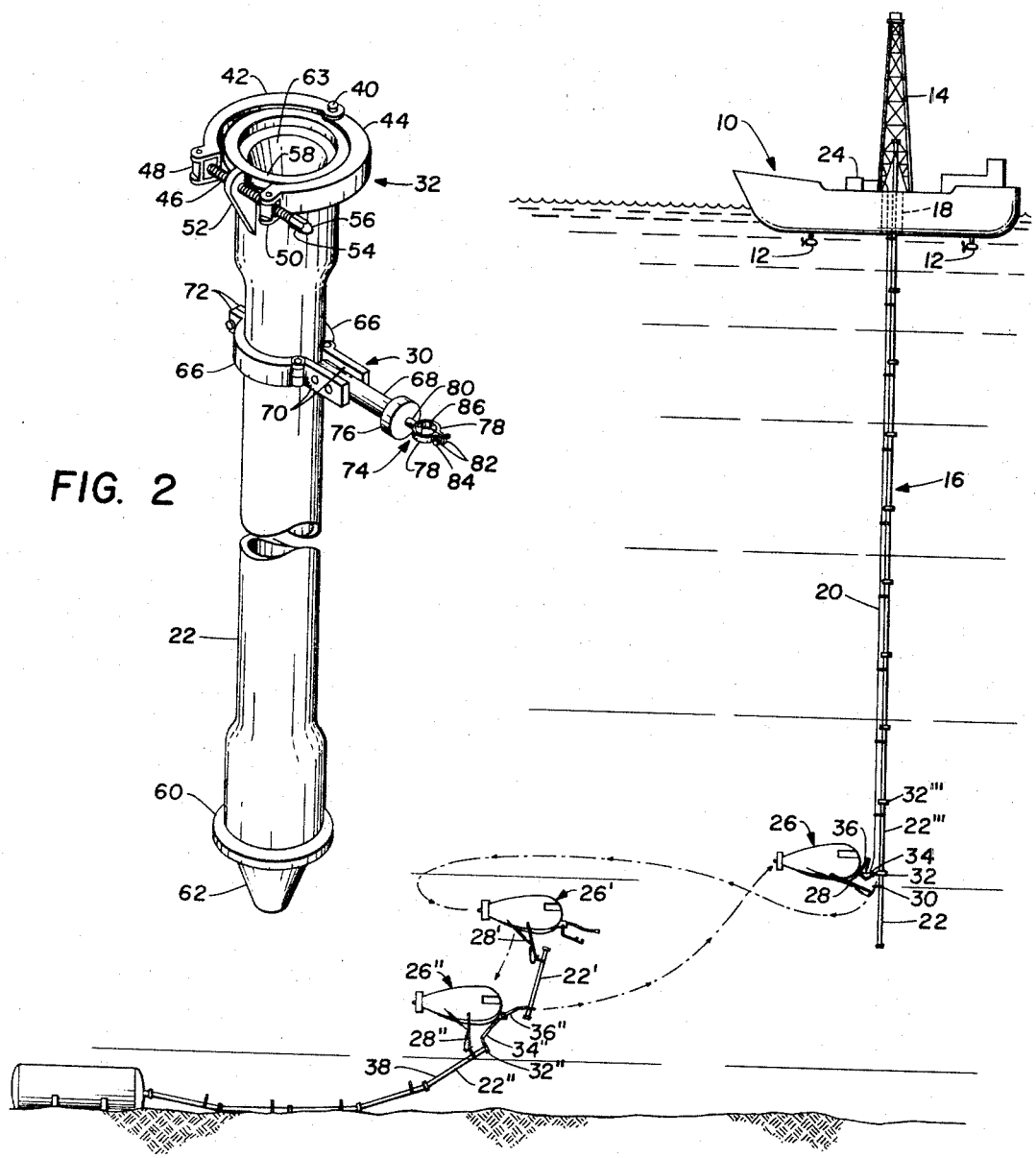

*Alan G. Paul*

ATTORNEY

United States Patent Office 3,434,295
Patented Mar. 25, 1969

3,434,295
PIPE LAYING METHOD
William F. Manning, Dallas, Tex., assignor to Mobil Oil
Corporation, a corporation of New York
Filed June 29, 1967, Ser. No. 649,933
Int. Cl. B63b *35/00;* F16l *1/00;* B63g *8/00*
U.S. Cl. 61—72.3                    19 Claims

ABSTRACT OF THE DISCLOSURE

This specification discloses a method for laying pipe on a marine bottom without inducing extreme bending stresses in the pipe. A string of pipe having releasable clamps joining each section of pipe is suspended from a surface vessel by means of a small derrick or workover rig. A pair of submersible work vehicles having articulated arms terminating in manipulative tools are employed. Using an articulated arm, the first of the submersible work vehicles opens a respective clamp to release the lowest section of pipe from the suspended string of pipe, while supporting the released section of pipe, and transports this section of pipe to the open end of an unfinished pipeline held up just above the marine bottom by a second submersible work vehicle. Using its articulated arms, the second submersible work vehicle aligns the section of pipe, being transported by the first submersible work vehicle, with the open end of the unfinished pipeline and closes an open clamp to fix it sealably in place. With the first submersible work vehicle now supporting the extended open end of the unfinished pipeline, the second submersible work vehicle is disconnected from the unfinished pipeline and returns to the lower end of the suspended string of pipe to release and transport the now lowest section of pipe back to the first submersible work vehicle still supporting the open end of the unfinished pipeline. As the weight of a section of pipe is transferred to and from a submersible work vehicle, the ballast tanks thereof must be trimmed. Compressed air for blowing the ballast tanks is supplied from an air hose suspended from the surface vessel adjacent the string of pipe.

BACKGROUND OF THE INVENTION

*Field of the invention*

This invention pertains to a method for laying a pipeline beneath the surface of a body of water without producing bending stresses of consequence in the pipe, and more particularly to a system for fabricating a subsea pipeline from short sections of pipe in deep offshore waters, in conjunction with submersible vehicles having articulated arms.

*Description of the prior art*

The prior art methods for laying pipe in offshore waters usually include a pipe laying barge upon which a pipeline is either made up by welding sections of pipe together as the pipeline is fed out into the water or, if the pipeline is flexible enough, it is wound on a large reel on deck. The prefabricated pipeline is then lowered into place on the marine bottom continuously from one end, the path traversed by the pipeline during the transient state between the barge and the marine bottom including the bending of the pipeline usually twice and at least once.

The P. A. Tesson Patent No. 3,237,438, issued Mar. 1, 1966, shows one example of generally conventional pipeline laying apparatus wherein the pipe is prefabricated and wound on a reel rotatable in a horizontal plane on the deck of a pipe laying barge. With such a system the pipeline is fed from the barge in a horizontal orientation and it must be continuously bent first vertically toward the marine bottom and then again horizontally to lay on the marine bottom. Such a configuration can be seen in the J. Delaruelle et al. Patent No. 3,273,346. In Delaruelle is disclosed a tubular guide for buoyantly supporting the upper bend of the pipeline in the water and relieving some of the stress therein. The bend in the portion of the pipe adjacent the marine bottom is controlled by a tension applied to the pipeline at the barge.

The T. E. Lewis Patent No. 1,152,326, issued Aug. 31, 1915, shows a pipe laying barge in which a single stringer is utilized for supporting the pipeline all the way from the barge to the marine bottom, the pipeline being lowered along the stringer as it is made up by welding sections together on the deck of the barge. As may be seen in the illustration of FIGURE 1, the pipeline is fabricated in a generally vertical orientation and only one bend is impressed on the pipeline. Devices such as that shown in the Lewis patent may be utilized in reasonably shallow water. However, a single stringer of this type would be prohibitively heavy, if not buoyed, and would have too much drag, even if buoyed, for use in deep water.

The B. L. Goepfert et al. Patent No. 3,214,921 discloses several methods for laying a pipeline on a marine bottom while producing only one continuous bend in the pipe. As shown in FIGURE 1 of Goepfert, the pipeline is fabricated in a vertical orientation on a barge in a manner very similar to that utilized in making up pipe on a drilling vessel. FIGURE 4 shows a prefabricated pipeline wound on a drum which is rotatable in a vertical plane, the orientation of the drum allowing the pipe to be unwound from the drum and directed through a vertical well extending through the barge. Although in each of these last-described embodiments the pipeline enters the water in a vertical orientation, it must then be reoriented into a horizontal position at the marine bottom as is shown in FIGURE 2 of Goepfert. Some sort of guide means or tensioning, or both, is necessary to perform this function. In the embodiment of FIGURE 4 it is noted that while the pipe is only bent once after it has entered the water, it was certainly bent to reel it on the drum; therefore, even this method may be considered as having two bends.

Regardless of which of the methods above is used, it is necessary that the pipe continuously bends, at least one time, before being permanently supported on the marine bottom, requiring that the pipe be designed to accept bending stresses. In recent engineering studies developed for the proposed Red Snapper pipeline system, it has been calculated that with a thirty-inch pipe there is needed a wall thickness of .563 inch for deepest water contemplated in this project, where bending is at a maximum, .531 for shallow water, where bending is not so great, and .500 for land, where there is no bending. These figures graphically indicate the greater stresses to be taken by the pipeline being laid under water which must withstand bending stresses. The pipe is proposed for Red Snapper is designed to take up to eighty-five percent of yield during bending in a smooth sea. No dynamic considerations have been taken into account in the present calculations. 5 LX–60 pipe (Code for Pressure Piping, Section 8, ASA, B–38.8), having a yield strength of sixty thousand pounds and longitudinal and transverse tensile strengths of seventy-five thousand pounds, was prescribed for the anticipated water depths. It has been calculated that for the Red Snapper system, the laying of pipe costs approximately one hundred seventeen thousand dollars a mile in the medium depth of water in which this pipeline is contemplated to be laid as compared to one hundred thousand dollars per mile on land. This is a difference of seventeen thousand dollars per mile. In one attempt at laying a deep water pipeline within this general set of specifications, it was found that an underwater kink would form in the pipe ever so often during the operation and the pipe would have to be pulled up until the kink was above the water surface. The kinked section was then cut out, and the pipe rewelded together. It was calculated that each operation to remove a kink cost approximately one hundred thousand dollars.

While the costs and difficulties involved in laying subsea pipelines, due to the stresses incurred during laying operations discussed above, would be enough to dissuade the more cautious and cost-conscious individual, another contingent problem has yet to be discussed. The latter problem is concerned with the size limitations to be imposed on subsea pipelines. The size of the pipe to be used is limited in part by the weight which the viscoelastic sea bottom can support. The bigger the diameter of the pipe, the greater the wall thickness necessary to take the bending stresses and therefore the heavier the pipe, or conversely if bending stresses could be eliminated a larger pipe with a thinner wall could be utilized which would still take the hoop loads imposed by the water pressure outside and/or the inner pressure of gas being transported therethrough.

The H. W. Phillips Patent No. 650,134, issued May 22, 1900, and the S. H. Robley Patent No. 3,204,417, issued Sept. 7, 1965, both disclose pipe laying apparatus wherein the bending of a prefabricated pipe is avoided by lowering individual pipe sections to the bottom, lining up each new section with the open end of the unfinished pipe, and connecting the sections thereinto. The Phillips patent provides guidelines extending from the marine bottom to guide a new section of pipe into alignment with the last pipeline section. In both of these patents, only one section of pipe is lowered at a time, and particularly in deep water this cannot be done very quickly. Any variation in the configuration of the marine bottom when using the Phillips system could easily cause a misaligned section of pipe to not properly be connected into the unfinished pipeline. In the areas where the bottom is unconsolidated, the pipeline end might very well sink beneath the bottom and be inaccessible for connecting a new section thereto. The Robley patent disclosure recognizes this and shows a diver on the bottom for directing the machinery.

SUMMARY OF THE INVENTION

The present invention provides an improved method for laying pipelines on a marine bottom without unduly stressing the pipe by bending the pipe, thereby allowing a larger, lighter pipe to be used. Furthermore, according to the teaching of this invention, a steady supply of pipe sections is lowered into the vicinity of the marine bottom, by a conventional drilling ship or small workover vessel, where the pipe sections can be handled by small manned submersible work vehicles of the type now being experimentally used offshore. The invention further provides a method for compensating for changing weight loads on the continuously submerged work vessel.

Specifically, the invention provides for the making up of a vertical string of pipe at a vessel positioned on the surface of a body of water over a subsea pipeline being fabricated on the marine bottom. The suspended string of pipe is extended until the lowest section of pipe is just above the marine bottom. The sections of pipe, of the string of pipe, are connected together by releasable clamps affixed to one end of each section of pipe. A threaded bolt is utilized as an actuator for each of the clamps. These clamps are designed to be actuated by a remotely controlled tool, such as a rotary barrel socket wrench. A transverse spar, terminating in an apertured portion, is affixed near the upper end of each of the sections of pipe. A pair of manned submersible work vehicles, to be located at the subsea site of the pipeline being constructed, is each equipped with an articulated arm terminating in such a tool. Submersible vehicles of this type and their capabilities for performing mechanical operations are more comprehensively discussed in the copending application Ser. No. 649,960, filed on the same date herewith, by Warren B. Brooks, Charles Ovid Baker, and Eugene L. Jones. Each of the submersible work vehicles also has a load-carrying undercarriage that protrudes out from under the front of the submersible work vehicle and is adapted to coact with the terminal apertured portions of the transverse spar.

In operation, one section of pipe is transported at a time from the lower end of the suspended string of pipe to the open end of the unfinished pipeline by a submersible work vehicle. The first submersible work vehicle is directed into close proximity with the lowest section of pipe of the suspended string and is positioned so that upwardly extending finger of the load-carrying undercarriage enters the terminal apertured portion of the transverse spar of the lowest section of pipe. As the submersible work vehicle is raised to take up the load of the lowest section of pipe, this section of pipe is disconnected from the suspended string by means of a complementary tool on the outer end of an articulated arm as previously discussed. The submersible vehicle then transports the section of pipe to the open end of the unfinished subsea pipeline where a second submersible work vehicle supports the outer end of the last section of pipe of the unfinished pipeline and, using an articulated arm, the second submersible work vehicle aligns the two above-designated sections of pipe, inserting an end of the transported section into the open end of the unfinished pipeline. The still open clamp on the outer end of the section of pipe, being supported by the second submersible work vehicle, is closed by another complementary tool terminating an articulated arm of the second submersible work vehicle to sealably connect the two sections of pipe together. The first submersible work vehicle is then left supporting the section of pipe now forming the last section of unfinished pipeline and the second submersible work vehicle disconnects itself from the now next-to-last section of pipe of the unfinished pipeline and moves back to the string of pipe, depending from the surface vessel to disconnect the now lowest section of pipe from the vessel and transport this section of pipe over to the first submersible vehicle now holding the outer end of the unfinished pipeline. Sections of pipe are added at the upper end of the string of pipe, above the surface, as sections are removed at the lower end.

It is necessary to provide a means for deballasting the submersible work vehicle each time it picks up a section of pipe and reballasting the submersible work vehicle each time it releases a section of pipe. While it might be possible for the submersible work vehicle, particularly where the water was not too deep, to carry enough compressed air to accomplish several trips, this would be a rather uneconomical, slow process if the submersible work vehicle had to come to the surface after several sections of pipe have been connected so as to receive a new supply of compressed air. Therefore, a flexible air pressure hose is provided extending from an air compressor on the surface vessel down to almost the bottom of the suspended string of pipe. The free lower end of the air hose is gripped and directed, by a tool on another articulated arm of the submersible work vehicle, and is plugged into a mating coupling portion in communication with the ballast tanks thereof. When the weight of a section of pipe is transferred to the submersible work vehicle, at the same time, enough water is blown out of the ballast tanks to compensate for the weight of the section of pipe in the water and maintain neutral buoyancy. The air hose is then disconnected by the gripping tool on the second articulated arm. When the submersible vehicle again releases the section of pipe, the extra air is released and the tanks reflooded to retain a neutral buoyancy in the water. When the submersible work vehicle returns for another section of pipe, it again couples the air hose to its ballast tanks and the above-described procedure is repeated. The air hose is kept in close proximity to the string of pipe by entraining the hose through the terminal apertures or guide rings of the spars fixed to each section of pipe. The air hose is slightly shorter than the pipe string and does not extend through the terminal guide ring of the lowest pipe section of the string of pipe leaving enough of a free end to reach the ballast tanks of an attendant submersible vehicle.

BRIEF DESCRIPTION OF THE DRAWINGS

FIGURE 1 is a schematic elevational view illustrating the method and apparatus involved.

FIGURE 2 is a perspective view of a pipe section of the present invention illustrating in particular the configuration of the pipe ends and a releasable clamp affixed to the upper end thereof.

DESCRIPTION OF THE PREFERRED EMBODIMENT

Figure 3:
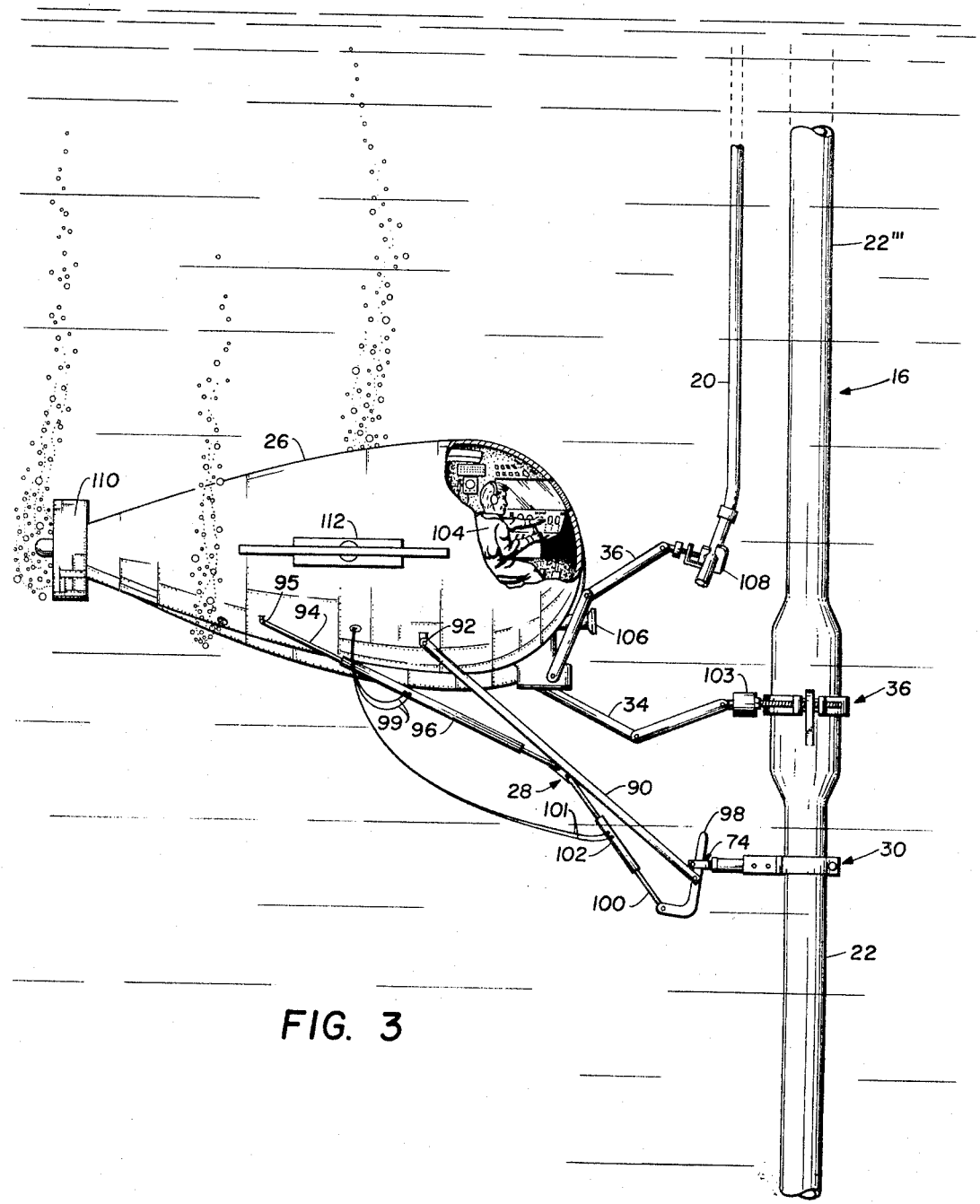
FIGURE 3 is a side elevational view of one of the manned submersible work vehicles of the present invention in the process of releasing a lowest section of pipe from the suspended string of pipe.

Now looking to FIGURE 1, a floating vessel, generally designated 10, is located at the site of the subsea construction of a pipeline by dynamic positioning motors 12. The floating vessel 10 has space aboard for storing pipe used in the construction of the proposed subsea pipeline and a derrick 14 mounted thereon for handling the pipe. A string of pipe, generally designated 16, is made up on the vessel 10 and suspended through a moonpool, shown in phantom at 18.

Also depending from the vessel 10 and constrained to lay alongside the string of pipe 16 is a flexible air pressure hose 20 terminating just short of the lowest section of pipe 22. The air hose 20 is connected through the moonpool 18 to an air compressor 24 on the deck of the vessel 10. A first manned submersible work vehicle 26, located adjacent the suspended string of pipe 16, has an undercarriage 28, a portion of which can coact with transverse spar, generally designated 30, affixed to the upper end of the section of pipe 22. A clamp 32, affixed to the upper end of the section of pipe 22, is released by a tool carried on an articulated arm 34 of the submersible vehicle 26. A second tool-carrying articulated arm 36 at the same time connects the free end of the air hose 20 to its ballast tanks. As the weight of the section of pipe 22 is transferred to the submersible vehicle 26, the clamp 32 is opened and section of pipe 22 is disconnected from the string of pipe 16 suspended from the vessel 10. Simultaneously air is pumped into the ballast tanks of the submersible vessel 26 to blow the tanks and retain neutral buoyancy. The submersible vehicle 26 is now able to transport the section of pipe 22 along the indicated path to a point where, as illustrated at 26', it is almost above and adjacent the second submersible vehicle designated 26''. The section of pipe hanging from the submersible vehicle 26', now indicated as 22', is then gripped by a tool carried on an articulated arm 36'' extending from the submersible vehicle 26''. The section of pipe 22' is guided by the arm 36'' into the open end of an unfinished pipeline 38, the last section of pipe 22' thereof being supported from the undercarriage 28'' of the submersible vehicle 26''. Another articulated arm 34''', carrying a tool identical with the tool described as being carried on the arm 34 of the submersible vehicle 26, is used to close a clamp 32'' affixed to the outer end of the section of pipe 22'' to form a watertight connection between the sections of pipe 22' and 22''. The submersible vehicle 26' continues to support the upper end of the pipe section 22' while the submersible vehicle 26'' disengages itself from the section of pipe 22'', while blowing air from its ballast tanks to reflood the tanks and restabilize itself under the lessened load. The submersible vehicle 26'' then travels back to the lower end of the suspended string of pipe 16 to pick up another section of pipe 22''', which is now the lowest section of pipe on the string 16.

The submersible vehicle 26'' now releases the section of pipe 22''' from the string 16 by opening the clamp 32''', and transports the section of pipe 22''' to substantially the position illustrated in FIGURE 1 by the section of pipe 22'. The submersible vehicle 26' now is in the position shown by the submersible vehicle 26'' in FIGURE 1, however, supporting the longer but still unfinished pipeline 38 by the now last section of pipe 22'. This series of operations is repeated until the pipeline 38 is completed.

In FIGURE 2, a section of pipe 22, representative of the sections of pipe making up the string 16, is illustrated in detail. The clamp 32, located on the upper end of the section of pipe 22, comprises a pair of jaws 42 and 44 pivoted on a pin 40 anchored in a radial tab (not shown) extending outwardly from the upper end of the section of pipe 22. The pair of jaws 42 and 44 are interconnected at their outer ends by a threaded bolt 46 rotatably journaled in a pillow block 48 at the outer end of the clamp jaw 42 and threadedly received in a tapped hole extending through the pillow block 50 pivotally mounted in the outer end of the clamp jaw 44. The threaded bolt 46 extends loosely through an apertured radial ear 52 fixed on the outer wall of the section of pipe 22, between the clamp jaws 42 and 44, to prevent misalignment of the clamp 32. A hex head 54, having a conical terminating section 56, is formed on the bolt 46. The particular hex head is designed to be easily receivable in a tool carried by the arm 34 of a submersible vehicle 26 and adapted for engaging the head 54 for rotation. The clamp 32 is designed to fixedly lock an outwardly extending flange 58 on the upper end of the section of pipe 22 in abutting relationship to an outwardly extending circumferential flange 60 on the lower end of the next abutting section of pipe 22. To provide a watertight seal, the lower end of the section of pipe 22, outwardly of the flange 60, has a frusto-conical terminating end 62 also functioning to aid in guiding the lower end of the pipe section 22 into a complementary conical aperture 63 in the upper end of the abutting section 22. By rotating the bolt 46, to split the clamp jaws 42 and 44, the lowest section of pipe 22 cn be removed from the string 16, and by later rotating the bolt 46 on the clamp 32'' on the section of pipe 22'' in the reverse direction, the pipe section 22' can be permanently connected thereto after the respective end flanges have been brought into abutting engagement and axial alignment under the direction of the submersible vehicle 26'' and with the help of the respective complementary frusto-conical guide end 62 and guide aperture 63.

One of the transverse spars 30 is affixed to each of the sections of pipe 22 near the upper end thereof by anchoring clamp halves 66 pivotally mounted in an opposed relationship to each other by hinge bases 70 fixed on opposite sides of the spar 30 by bolts extending therethrough. Each clamp half 66 has an outstanding ear 72 on the free end thereof through which the clamp halves may be bolted together to cooperateively tightly grip the outer wall of the respective section of pipe 22. The spar 30 has an apertured terminating portion or guide ring 74 connected to the outer end thereof by a rotatable connection or bearing 76, the guide ring 74 comprising a pair of arcuate sections 78 pivoted at their inner ends on a short axial shaft 80 extending axially outwardly from the rotatable connection 76. Each of the arcuate sections 78 has an outstanding ear 82 on the outer end thereof, and releasable fastening means such as a nut and bolt 84 are provided to securely fasten the complementary pairs of arcuate sections 78 in abutting relation to form an internally circular guide aperture 86. As each section 22 is added to the string of pipe 16 at the vessel 10, one of the spars 30 is clamped thereto in alignment with the spars 30 already fastened to the sections of pipe 22 below. The respective guide ring 74 is also clamped around the air hose 20 so as to keep the hose restrained.

FIGURE 3 is an enlargement of the portion of FIG-

URE 1 illustrating the submersible work vehicle 26 located adjacent the string of pipe 16. The two submersible vehicles are identical and this subsequent discussion is also relevent to the submersible vehicle 26". The undercarriage 28, only briefly described above, can be seen in detail in this view to comprise a pair of main struts 90 (only one shown), pivotally mounted on pins 92 on opposite sides of the hull of the submersible vehicle 26, and a pair of adjustable length links 94 (only one shown) each having an expansible piston-cylinder section 96 therein, the adjustable length links 94 also being pivotally mounted on the hull of the submersible vehicle 26 on a pair of pins 95, behind the pivot pins 92 of the main struts 90. The outer ends of the adjustable length links 94 are pivotally connected midway along the lengths of the main struts 90. An adjustable finger 98 is pivotally mounted between the outer ends of the main struts 90, its orientation with respect to the main struts 90 being controlled by an adjustable length link 100 having an expansible piston-cylinder section 102 therein. The finger 98 is designed so that it may be received within the clamped guide ring 74 to transfer the support of the entire weight of the section of pipe 22 to the submersible work vehicle 26 when the clamp 32 of the respective section of pipe 22 is opened. The undercarriage 28 is adjustably positioned through changing the length of the adjustable length link 94 by applying fluid pressure through a selected hydraulic line 99. This permits the section of pipe 22, being transported, to be brought in line with the center of gravity of the submersible work vehicle 26 while the vehicle 26 is conveying the respective section of pipe 22 from the vicinity of the string of pipe 16 to the open end of the unfinished pipeline 38. The position of the finger 98 is adjustable, by applying fluid pressure through a selected hydraulic line 101, to more easily allow the finger 98 to be disengaged from the guide ring 74 when the submersible vehicle is in the position shown at 26".

To release the setcion of pipe 22 from the string 16, the clamp 32 is opened by rotating the bolt 46, the hex head 54 being within a socket wrench tool 103 carried by the articulated arm 34, and the actuation of the tool 103 being under the control of an operator 104 in the submersible work vehicle 26. While the clamp 32 is being opened, the vehicle 26 takes up the weight of the section of pipe 22 through the undercarriage 28, the free end of the air hose 20 having been guided into coupling relationship with an outwardly extending funneled tube 106, extending outwardly from the hull of the submersible vehicle 26, connected within the hull of the submersible work vehicle 26 with the ballast tanks (not shown). A collect type hydraulic connector within the funneled tube 106, controlled by the operator 104, may be utilized to releasably lock the outer end of the hose 20 sealably in place. The air hose 20 is guided into the funneled tube 106 by a vice grip type of tool 108 carried on the outer end of the articulated arm 36 so that compressed air can be driven into the ballast tanks of the submersible work vehicle 26 from the air compressor or pump 24 on the vessel 10. Enough water is displaced to maintain the neutral buoyancy of the submersible work vehicle 26. This vice grip tool 108 may be the same one as that illustrated in FIGURE 1 as being carried by the arm 36" of the submersible work vehicle 26" for gripping the lower end of the pipe section 22; or, due to the large difference in diameter between two elements to be gripped, the submersible vehicle 26 may carry an outside tool carrier (not shown) to permit the arm to be alternately plugged into the two different sized vice grip tools. The submersible work vehicle 26 is moved through the water by a main drive motor 110 and a pair of rotatably mounted positioning motors 112, one on each side thereof to allow with the string of pipe 16 and the open end of the unfinished pipeline 38. Such a submersible vehicle is shown in detail in the H. E. Froelich U.S. Patent No. 3,158,123, issued Nov. 24, 1964.

As an alternative to using the socket wrench tool 103 to open and close the clamps 32 and 32", expansible, fluid-actuated, piston-cylinder links (not shown) could interconnect the outer ends of each pair of jaws 42 and 44 of the clamps 32. A pair of pipe nipples, on the opposite sides of each of the piston-cylinder arrangements, would be releasably fluidly connected to a source of fluid pressure within the submersible vehicle through the fluid path within the arm 34 and a fluid coupling connector portion (not shown) replacing the socket wrench 103. A similar embodiment, which would lessen the required number of articulated arms and/or the number of tools to be carried by the arms of the submersible work vehicle 26 would be to have an extensible fluid pressure hose (not shown carried in the hull of the submersible work vehicle 26, and connected to a source of fluid pressure therewithin. If it is not practical to have a source of fluid pressure within the submersible work vehicle, the fluid pressure hose, similar to the air hose 20, could be connected from a source of fluid pressure on the surface vessel 10 and depend therefrom, the lower end being in the area of the lowest section of pipe 22. With an adjustable size vice grip 108, as previously discussed, only one articulated arm would be necessary to couple the fluid pressure hose to the nipples of extensible link to actuate the respective clamp 32, couple the air hose 20 to the ballast tanks to drive water out of the submersible work vehicle, and to grip the end of a transported section of pipe to align the transported section of pipe with the open end of the unfinished subsea pipeline 38 while supporting the open end of the unfinished subsea pipeline 38 above the marine bottom.

If it is just as convenient to utilize a submersible work vehicle 26 having at least a pair of articulated arms, the small vice grip tool 108, as shown in FIGURE 3, on arm 34, would then be used only to couple the extensible fluid hose to the nipples of the extensible link of a fluid pressure-actuated clamp and to direct the air hose 20 as shown. A larger vice grip tool, carried on the arm 36, would serve to grip a section of pipe (as illustrated by the vice grip tool on the arm 36" gripping an end of the section of pipe 22' in FIGURE 1). In the last-discussed instance, the vice grip tools could be permanently fixed to the respective arms.

Although the present invention has been described in connection with details of a specific method and apparatus, it is to be understood that such details are not intended to limit the scope of the invention. The terms and expressions employed are used in a descriptive and not a limiting sense and there is no intention of excluding such equivalents in the invention described as fall within the scope of the claims. Now having described the apparatus and method herein disclosed, reference should be had to the claims which follow.

What is claimed is:

1. A method for constructing a subsea pipeline without incurring excessive bending stresses in the pipe comprising the following steps:
   (a) suspending from a surface vessel located at the site of subsea pipeline construction, down into a body of water, a string of pipe made up of releasably connected sections of pipe,
   (b) releasing at least the lowest section of pipe from the submerged lower end of said suspended string,
   (c) transporting said released section of pipe underwater from the lower end of said string to an unfinished end of said subsea pipeline, and
   (d) sealably connecting said transported section of pipe to said unfinished subsea pipeline to extend said unfinished subsea pipeline.

2. The method of constructing a subsea pipeline, as recited in claim 1, comprising the following additional step:
   (g) spacing an end of said unfinished pipeline above the marine bottom while sealably connecting said transported section of pipe thereto.

3. The method of constructing a subsea pipeline, as recited in claim 1, wherein the means for releasably connecitng sections of pipe comprises a releasable clamp affixed to one end of each section of pipe, means for actuating each of said clamps to open said jaws of respective clamp to release a section of pipe from said string of pipe, and to close said jaws of said respective clamp to connect a section of pipe to an end of an unfinished pipeline at least partially comprising said sections of pipe.

4. The method of constructing a subsea pipeline, as recited in claim 3, wherein said means for actuating each of said clamps is a threaded bolt having a head adapted to be engaged by a tool.

5. The method of constructing a subsea pipeline, as recited in claim 4, wherein said bolt head is so shaped that it can be rotated by a socket wrench.

6. The method of constructing a subsea pipeline, as recited in claim 1, wherein said sections of pipe are transported between the lower end of said depending string of pipe and an end of said unfinished subsea pipeline by a submersible work vehicle.

7. The method of constructing a subsea pipeline, as recited in claim 6, wherein an adjustable undercarriage for supporting sections of pipe to be transported is mounted on said submersible work vehicle including the following additional steps:
(e) extending a portion of said undercarriage forward of said submersible work vehicle to coact with a corresponding portion of a section of pipe to suspend said section of pipe from said submersible work vehicle, and
(f) retracting a portion of said undercarriage, after said section of pipe is released from said suspended string of pipe, to adjustably position said released section of pipe in line with the center of gravity of said submersible work vehicle.

8. The method of constructing a subsea pipeline, as recited in claim 6, wherein said submersible work vehicle is equipped with at least one articulated arm carrying a tool, a releasable clamp affixed to one end of each of said sections of pipe of said string of pipe, and a clamp actuator on each of said clamps, said actuator being adapted to be operated by said tool carried on said articulated arm whereby each of said clamps can be opened consecutively to release a respective section of pipe from said string of pipe and each of said clamps can be closed to connect a section of pipe to an end of said unfinished pipeline.

9. The method of constructing a subsea pipeline, as recited in claim 1, wherein said sections of pipe are released from said string of pipe by a tool carried by a subersible work vehicle.

10. The method of constructing a subsea pipeline, as recited in claim 9, wherein there is a releasable clamp affixed to an end of each of said sections of pipe, and a calmp actuator on each of said clamps adapted to be operated by said tool carried by said submersible work vehicle to open each of said respective clamps.

11. The method of constructing a subsea pipeline, as recited in claim 1, wherein said sections of pipe released from the lower end of said string of pipe are sealably connected to an end of said unfinished subsea pipeline by a tool carried by an attendant submersible work vehicle.

12. The method of constructing a subsea pipeline, as recited in claim 11, wherein there is a releasable clamp affixed to an end of each of said sections of pipe, and a clamp actuator on each of said clamps adapted to be operated by said tool carried by said submersible work vehicle to close said clamp.

13. The method of constructing a subsea pipeline, as recited in claim 1, wherein there are at least a pair of manned submersible work vehicles, each provided with at least one tool-carrying articulated arm, located at the site of said unfinished subsea pipeline for performing steps (b)–(d) including a first submersible work vehicle having the capability of releasing said lowest section of pipe from said pipe string and transporting said released section of pipe to an end of said unfinished pipeline, and a second submersible work vehicle having the capability of connecting one end of said transported section of pipe to an end of said unfinished pipeline while said transported section of pipe is being supported adjacent the respective end of said unfinished pipeline by said first submersible work vehicle.

14. The method of constructing a subsea pipeline, as recited in claim 13, comprising the following additional step:
(h) supporting an end of said unfinished pipeline above said marine bottom with said second submersible work vehicle while sealably connecting an end of said transported section of pipe to the supported end of said unfinished pipeline.

15. A method for maintaining substantially neutral buoyancy in a submersible work vehicle utilized for transporting material between a first and second point beneath the surface of a body of water comprising:
(a) locating a surface vessel, having an air compressor thereon, over said first point at which the weight of said material to be transported is transferred to said submersible work vehicle,
(b) suspending a flexible air hose connected to said air compressor from said surface vessel into an area adjacent said first point,
(c) connecting the lower end of said flexible air hose to said submersible work vehicle,
(d) driving at least some of the water out of ballast tanks of said submersible work vehicle through the application of air under pressure supplied through said flexible air hose as the weight of the material to be transported is transferred to said submersible work vehicle whereby said submersible work vehicle, maintains substantially neutral buoyancy, and
(e) at least partially reflooding said ballast tanks of said submersible work vehicle when said submersible work vehicle is relieved of the weight of said material at the second point whereby said submersible work vehicle maintains substantial neutral buoyancy at all times that it is freely floating beneath said surface of said body of water.

16. The method for maintaining substantially neutral buoyancy in a submersible work vehicle, as recited in claim 15, wherein said submersible work vehicle is provided with at least one articulated arm under the control of an operator within said submersible work vehicle, and a tool carried on said arm adapted to grip the lower end of said air hose suspended in said body of water and releasably coupled said air hose to said ballast tanks to drive at least some of the water out of said ballast tanks 17. A method for constructing a subsea pipeline without incurring excessive bending stresses in the pipe, utilizing a pair of submersible work vehicles each being provided with at least one articulated tool-carrying arm, comprising the following steps:
(a) suspending from a surface vessel located at the site of subsea pipeline construction, a string of pipe made up of releasably connected sections of pipe,
(b) releasing at least the lowest section of pipe from said suspended string of pipe in conjunction with a tool-carrying arm on a first of said submersible work vehicles,
(c) transporting under water, by means of said first submersible vehicle, said released section of pipe, from the lower end of said string of pipe to an end of said unfinished subsea pipeline,
(d) supporting said end of said unfinished subsea pipeline above the marine bottom, and (e) sealably connecting said transported section of pipe to said end of said unfinished subsea pipeline in conjunction with a tool-carrying arm on said second of said submersible work vehicles to extend said unfinished subsea pipeline.

18. A method for constructing a subsea pipeline, as recited in claim 17, including the following additional step:
(f) prior to sealably connecting said transported section of pipe to said end of said unfinished subsea pipeline, guiding a connecting end of said transported section of pipe into alignment with said end of said unfinished subsea pipeline in conjunction with a tool-carrying arm of said second submersible work vehicle.

19. A method for constructing a subsea pipeline, as recited in claim 18, comprising the following additional steps:
(g) subsequent to sealably connecting said transported section of pipe to said end of said unfinished subsea pipeline, disconnecting said second submersible work vehicle from said unfinished subsea pipeline, while leaving said first submersible work vehicle supporting the new end of said unfinished subsea pipeline above said marine bottom,
(h) repositioning said second submersible work vehicle at said lower end of said string of pipe,
(i) releasing the now lowest section of pipe and transporting said latest released section of pipe to said new end of said unfinished subsea pipeline, and
(j) guiding one end of the transported, latest released, section of pipe to said new end of said unfinished subsea pipeline and sealably connecting the unconnected end of the last transported section of pipe to an end of said transported, latest released, section of pipe in conjunction with a tool-carrying articulated arm of said first submersible work vehicle to further extend said unfinished subsea pipeline.

References Cited

UNITED STATES PATENTS

| | | | |
|---|---|---|---|
| 1,869,778 | 8/1932 | Roberts | 61—72.3 |
| 2,787,051 | 4/1957 | Risley. | |
| 2,987,893 | 6/1961 | Robinson | 61—69 |
| 3,099,913 | 8/1963 | Melton et al. | 61—69 |
| 3,105,453 | 10/1963 | Hayes | 61—69 X |
| 3,165,899 | 1/1965 | Shatto | 61—69 |
| 3,204,417 | 9/1965 | Robley | 61—72.3 |
| 3,261,398 | 7/1966 | Haeber | 166—.5 |
| 3,262,275 | 7/1966 | Perret | 61—72.3 |
| 3,307,627 | 3/1967 | Shatto | 61—72.3 |
| 3,393,524 | 7/1968 | Terrell | 61—72.3 X |

FOREIGN PATENTS 1,246,266  10/1960  France.

EARL J. WITMER, *Primary Examiner.*

U.S. Cl. X.R.

285—18, 367; 114—16

UNITED STATES PATENT OFFICE
CERTIFICATE OF CORRECTION

Patent No. 3,434,295                                               March 25, 1969

William F. Manning

It is certified that error appears in the above identified patent and that said Letters Patent are hereby corrected as shown below:

Column 2, line 56, "is" should read -- as --. Column 5, line 62, "section of pipe 22'" should read -- section of pipe 22" --. Column 6, line 41, "cn" should read -- can --; line 57, "cooperateively" should read -- cooperatively --. Column 7, line 4, "relevent" should read -- relevant --; line 38, "setcion' should read -- section --; line 51, "collect" should read -- collet --; line 72, before "with the string" insert -- the submersible vehicle 26 to be guided into alignment --. Column 8, line 15, "(not shown" should read -- (not shown) --. Column 9, lines 4 and 5, "connecitng" should read -- connecting --; line 59, "calmp" should read -- clamp --. Column 10, line 41, before "maintains" cancel the comma; line 57, after "tanks" insert a period.

Signed and sealed this 7th day of April 1970.

(SEAL)
Attest:

EDWARD M. FLETCHER, JR.                            WILLIAM E. SCHUYLER, JR.
Attesting Officer                                       Commissioner of Patents